(12) United States Patent
Romanenko

(10) Patent No.: US 11,228,187 B2
(45) Date of Patent: Jan. 18, 2022

(54) CADDY CHARGER

(71) Applicant: Paul Andrew Romanenko, Boynton Beach, FL (US)

(72) Inventor: Paul Andrew Romanenko, Boynton Beach, FL (US)

( * ) Notice: Subject to any disclaimer, the term of this patent is extended or adjusted under 35 U.S.C. 154(b) by 780 days.

(21) Appl. No.: 13/887,312

(22) Filed: May 4, 2013

(65) Prior Publication Data

US 2014/0327387 A1    Nov. 6, 2014

(51) Int. Cl.
  *H02J 7/00*  (2006.01)
  *G06F 1/26*  (2006.01)
  *G06F 1/16*  (2006.01)

(52) U.S. Cl.
  CPC .......... *H02J 7/0044* (2013.01); *G06F 1/1632* (2013.01); *G06F 1/263* (2013.01); *H02J 7/0027* (2013.01); *Y10T 29/49117* (2015.01)

(58) Field of Classification Search
  CPC .. B65D 1/24; B65D 1/36; B65D 25/04; H02J 7/0042; H02J 7/0044; H02J 7/0027; G06F 1/1632; G06F 1/263; G06F 1/266; G06F 1/30
  USPC .................................................. 320/114, 115
  See application file for complete search history.

(56) References Cited

U.S. PATENT DOCUMENTS

| | | | |
|---|---|---|---|
| 4,503,982 A | 3/1985 | Lewis | |
| 5,372,273 A * | 12/1994 | Eves | A61C 19/005 206/45.24 |
| 5,388,697 A | 2/1995 | James | |
| 6,123,010 A * | 9/2000 | Blackstone | A47J 31/005 99/279 |
| 8,154,872 B2 | 4/2012 | Hussaini | |
| 2007/0272629 A1* | 11/2007 | Spirer | A47B 49/00 211/10 |
| 2008/0258677 A1* | 10/2008 | Lee | H02J 7/0027 320/101 |

(Continued)

FOREIGN PATENT DOCUMENTS

| | | | | |
|---|---|---|---|---|
| JP | 2013070305 A * | 4/2013 | | H04M 1/06 |
| WO | WO 2012040344 A2 * | 3/2012 | | B65D 25/04 |

*Primary Examiner* — Richard Isla
*Assistant Examiner* — Michael N Dibenedetto
(74) *Attorney, Agent, or Firm* — Akerman LLP; Peter A. Chiabotti

(57) ABSTRACT

A Charging Caddy (Caddy) comprises of a charging base and various interchangeable multi-use apparatus (IMA) which individually attach to a Caddy base. The Caddy's various IMAs complement the setting and décor of the Caddy's location. The base is powered by a wall outlet and a rechargeable battery providing the option of simultaneously charging multiple tablets and communication devices (TCD). The rechargeable battery further extends the versatility of the Caddy when a power outlet is not readily available. TCDs such as iPod, iPad, various tablets, laptops, cell phones, or other peripheral devices can be charged using one or more: dedicated or non-dedicated USB ports, cigarette lighter ports, 120 v plugs, or TCD cradles. The non-dedicated USB ports allow for the devices to communicate using networking protocols. The interchangeable multi-use apparatus and charging base create a unique embodiment allowing the components to be used separately, simultaneously, or in tandem with charging TCDs.

18 Claims, 6 Drawing Sheets

(56) References Cited

U.S. PATENT DOCUMENTS

| | | | | |
|---|---|---|---|---|
| 2009/0115370 | A1* | 5/2009 | Vasko | H02J 7/0027 320/115 |
| 2009/0189351 | A1* | 7/2009 | Baerlocher | G07F 17/32 273/309 |
| 2009/0323293 | A1* | 12/2009 | Koetting | H01M 10/425 361/736 |
| 2010/0123431 | A1* | 5/2010 | Prokos | H01R 24/58 320/114 |
| 2010/0127661 | A1* | 5/2010 | Stocking | H02J 7/0044 320/115 |
| 2011/0238437 | A1* | 9/2011 | Zhou | G06F 19/3487 705/2 |
| 2011/0238467 | A1* | 9/2011 | Duley | G06Q 30/02 705/14.4 |
| 2012/0104994 | A1* | 5/2012 | Esnard-Domerego | H02J 7/0068 320/107 |
| 2012/0280647 | A1* | 11/2012 | Perez | G09F 23/00 320/107 |
| 2014/0349591 | A1* | 11/2014 | Tamatsu | H04M 1/06 455/74.1 |

* cited by examiner

CADDY CHARGER

BACKGROUND

The patent field relates to the charging of tablets and communication devices (referred to as TCD) using one or more: dedicated and non-dedicated USB ports, 120 v plugs, cigarette lighter ports, or TCD cradles while accommodating the use and esthetic criteria of residential or business décor where the Charging Caddy is located. To date, devices capable of charging TCDs do not take into consideration the décor and surroundings of the business or residences in which the device is being used. Other embodiments of caddys do not provide a charging option thus limiting the caddy's usage and ability to charge TCDs. The following is a tabulation of prior art that is relevant to these limitations:

| Patent # | Kind Code | Issue Date | Patentee |
| --- | --- | --- | --- |
| U.S. Pat. No. 4,503,982 | | 1985 Mar. 12 | Lewis |
| US 005388697 | A | 1995 Feb. 14 | James |
| US 008154872 | B2 | 2012 Apr. 10 | Hussaini et al |
| US 2011/0238467 | A1 | 2011 Sep. 29 | Duley et al |
| US 2012/0280647 | A1 | 2012 Nov. 08 | Perez |

Device such as U.S. Pat. No. 4,503,982 Lewis "Dispenser for cup lids and straws" takes storage needs of straws and lids into consideration but does not offer a charging option. Patent number US 005388697A James "Beverage identification system" provides a means of identifying various items and allows for storage of said items. Specifically FIG. 1 drawing item number 17, napkin holder, does not provide any charging options. Patent number US 008154872B2 Hussani et al "Portable hand held multi-source power inverter with pass through device" does provide a cigarette lighter port, USB port, and 120 v plug as a power source. However there is no consideration for any storage of items such as menus, coasters, napkins, or highlighting daily specials.

Patent application US 2011/0238467A1 Duley "Caddie Apparatus with Display Capabilities" incorporates the display capacities within a bar caddy apparatus, but does not provide any way of charging TCDs, nor takes into consideration the ability to change the condiment storage configuration for various settings or environments. Patent Application US 2012/02804647A1 Perez "Battery Recharging Station For Use in a Bar" does consider the charging of TCDs. However it does not consider charging using a battery source or a cigarette lighter port. Nor does it consider the need or ability to have other multi-use configurations of the billboard frame, FIG. 7, to meet alternative settings.

BRIEF SUMMARY OF INVENTION

A Charging Caddy (referred to as a Caddy) provides the ability to charge a depleted battery of various tablets or communication devices (referred to as TCD) using a number of readily available power adaptors or chargers. This can be achieved by one or more: dedicated USB ports (providing 1 A (amp) or more of current), non-dedicated USB ports (providing current and networking capability), 12 v cigarette lighter ports, a 120 v plug, or TCD cradle. Power to the Caddy is provided by an external source (wall plug), an rechargeable battery, or both. Thus, when exclusively using the rechargeable battery, the Caddy provides the option of being a stand-alone charger for TCDs when conventional power sources are not readily available.

Given the design of the Charging Caddy, it can accommodate various interchangeable multi-use apparatus (referred to as IMA) that securely attach to the upper surface of the Caddy base to meet the ambiance of an establishment. For example in a restaurant setting, an IMA suitable for menus, condiments, and daily specials could be attached. In a bar, an IMA suitable for coasters, beverage napkins, and straws. In a car dealership, waiting room, or airport terminal, an IMA containing a display screen would present advertisements or customer information. To meet the needs or requirements of the establishment, the IMA of a Caddy can be customized while still meeting the charging needs of various TCDs. The IMA and the Caddy base can be used separately, simultaneously or in tandem while charging devices.

DETAILED DESCRIPTION

Figure 1:
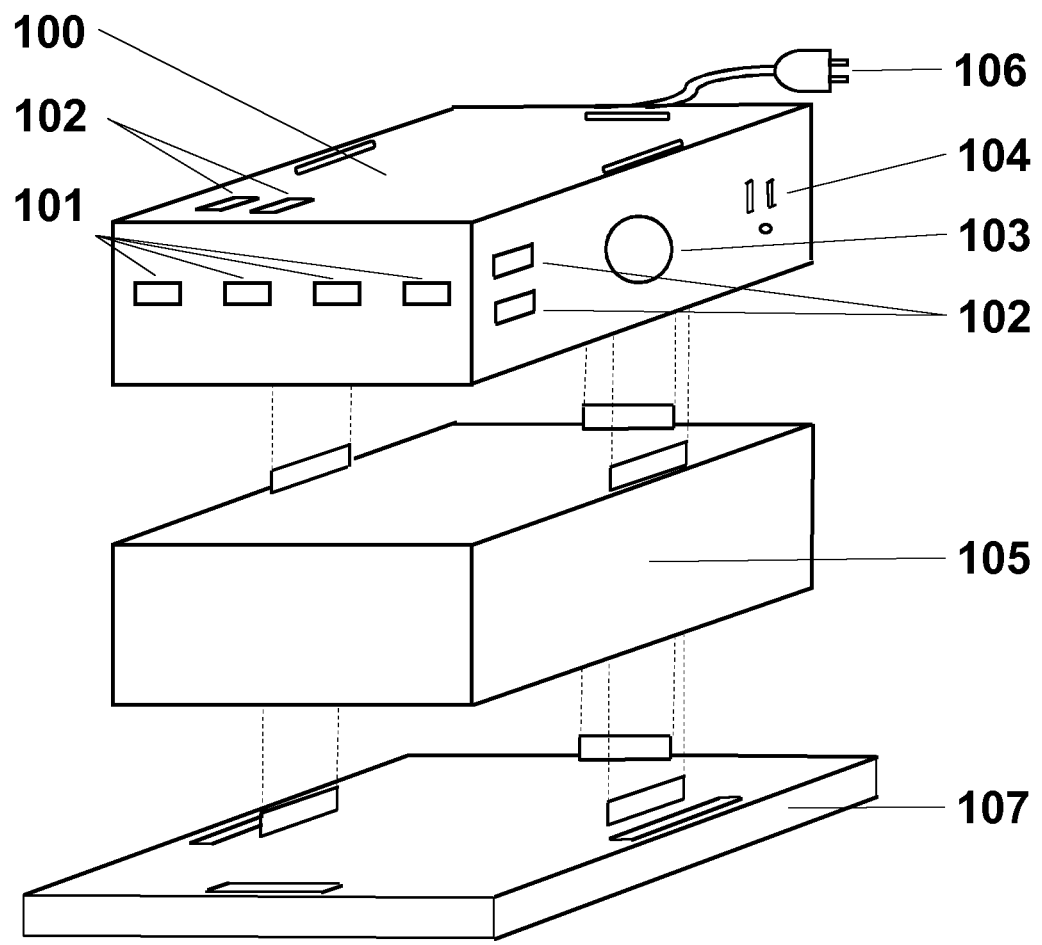
FIG. 1 Charging Caddy base with optional rechargeable battery and TCD (tablets and communication devices) cradle.

FIG. 1 Considering the various types of tablets and communication devices (referred to as TCD) used in today's society, battery consumption and the need to recharge the devices' battery is at an all-time high. From laptops, to tablet devices, to cell phones and peripheral devices all require different charging specifications and modes of charging. The Charging Caddy (referred to as Caddy) 100 takes all TCDs into consideration by providing various options to recharge the depleted battery of the device. From one or more: dedicated USB ports (providing 1 A (amp) or more of current) 101, non-dedicated USB ports (providing current and networking capability) 102, to cigarette lighter ports (12V) 103, 120 v plugs 104, and TCD cradle 107. Regardless of the type of charger used with TCDs, the Caddy provides a means to supply power to recharge TCDs. Due to the different environments or settings the Caddy could be used in, providing a constant source of power to the Caddy is imperative. The Caddy has the option of containing a rechargeable battery 105 allowing for use in remote locations, a power lead to be connected to a 120 v plug (wall outlet) 106, or both.

Figure 2:
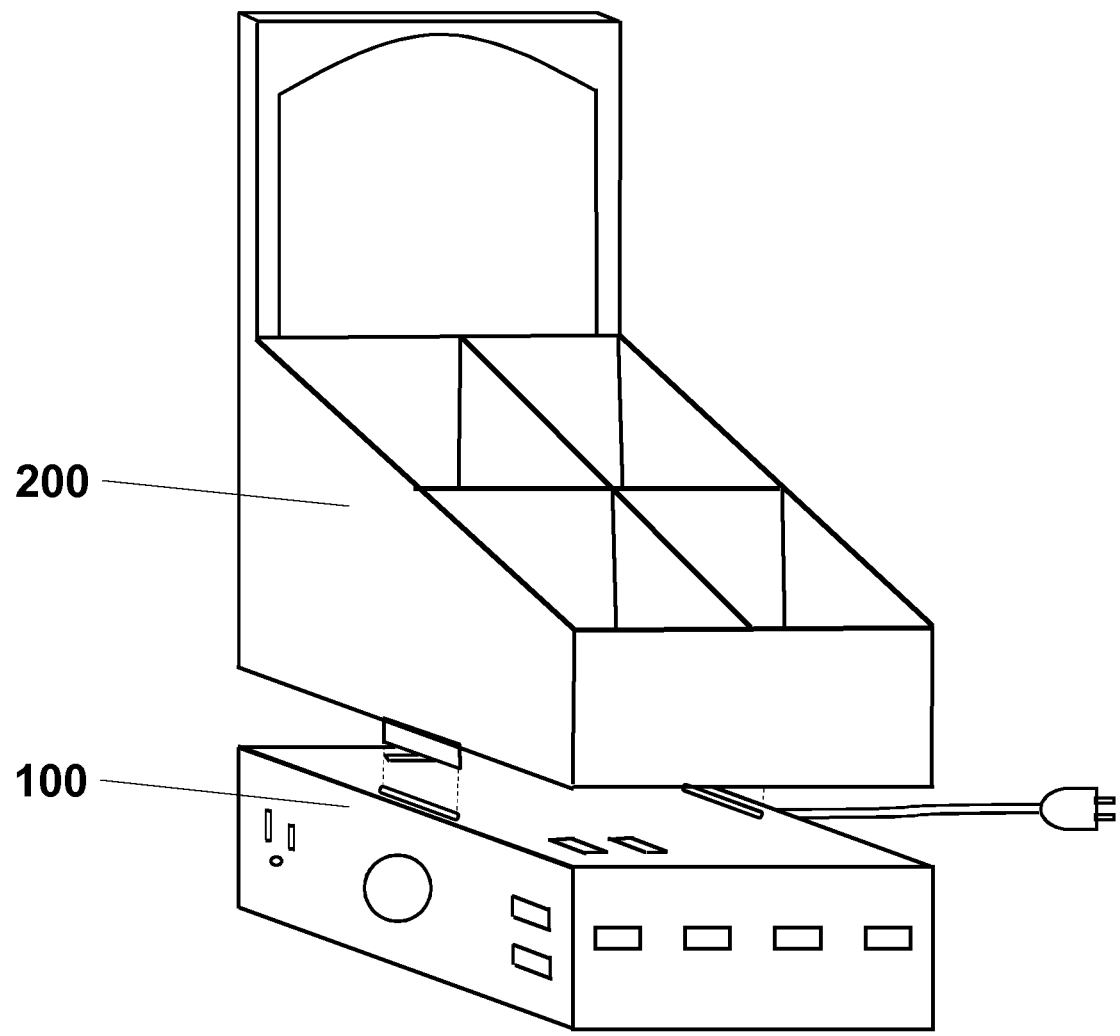
FIG. 2 Condiment IMA affixed to Charging Caddy base.

FIG. 2 Given the large scope of TCDs the Charging Caddy can accommodate, it is suitable for use in a variety of settings. To aid in the Caddy's integration, a variety of interchangeable storage apparatus (referred to as IMA) may be affixed to the upper surface of the Charging Caddy base 100. For instance in a restaurant setting, an IMA accommodating menus, condiments, or other information could be affixed 200.

Figure 3:
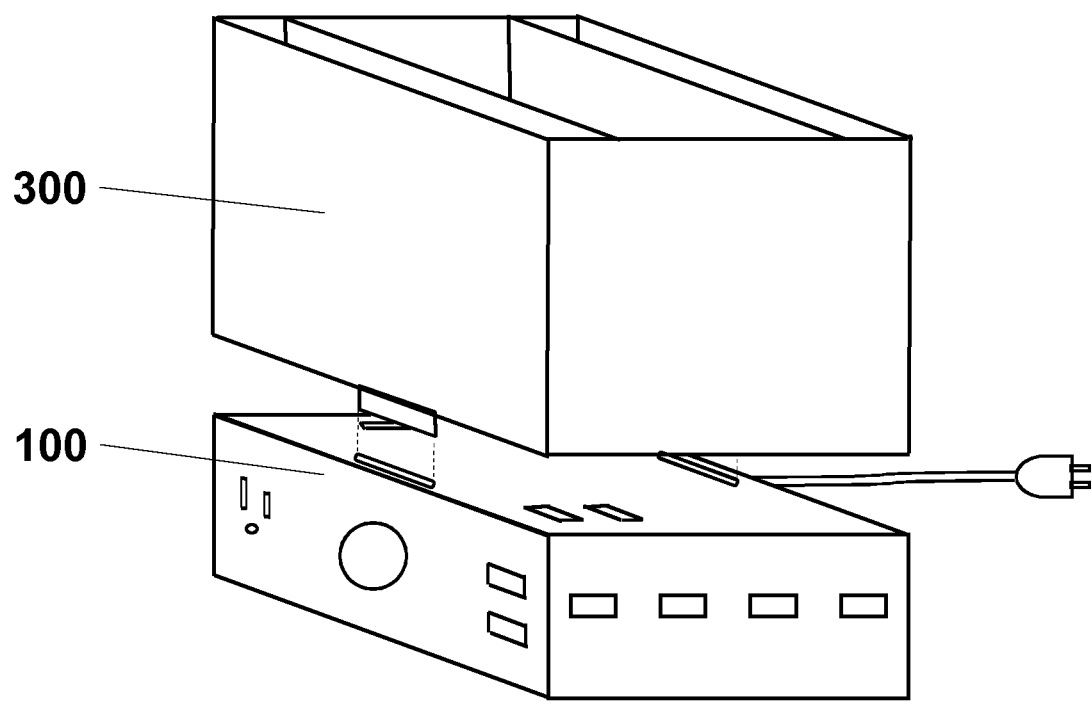
FIG. 3 Straw, coaster, or napkin IMA affixed to Charging Caddy base.

FIG. 3 In a bar, an IMA accommodating straws, beverage napkins or coasters 300 may be affixed to the Caddy base 100.

Figure 4:
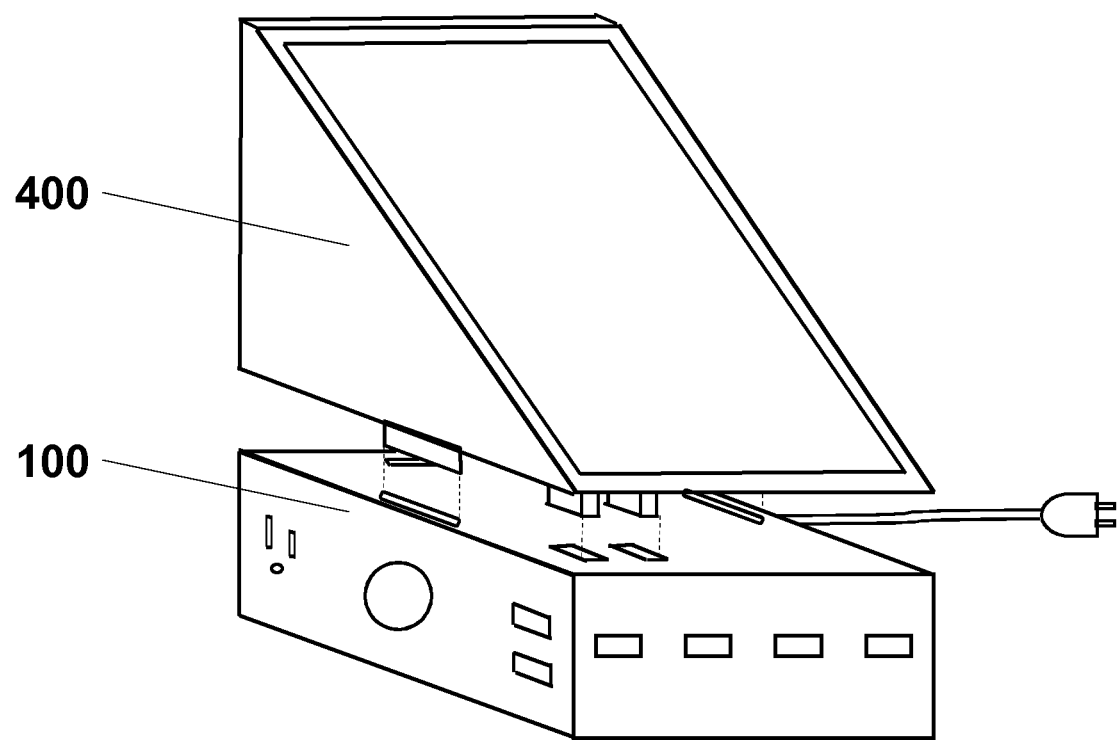
FIG. 4 Display screen IMA affixed to Charging Caddy base.

FIG. 4 In a car dealership, waiting room, or airport terminal, a display screen 400 with advertisements or customer information could be affixed to the Caddy base 100.

Figure 5:
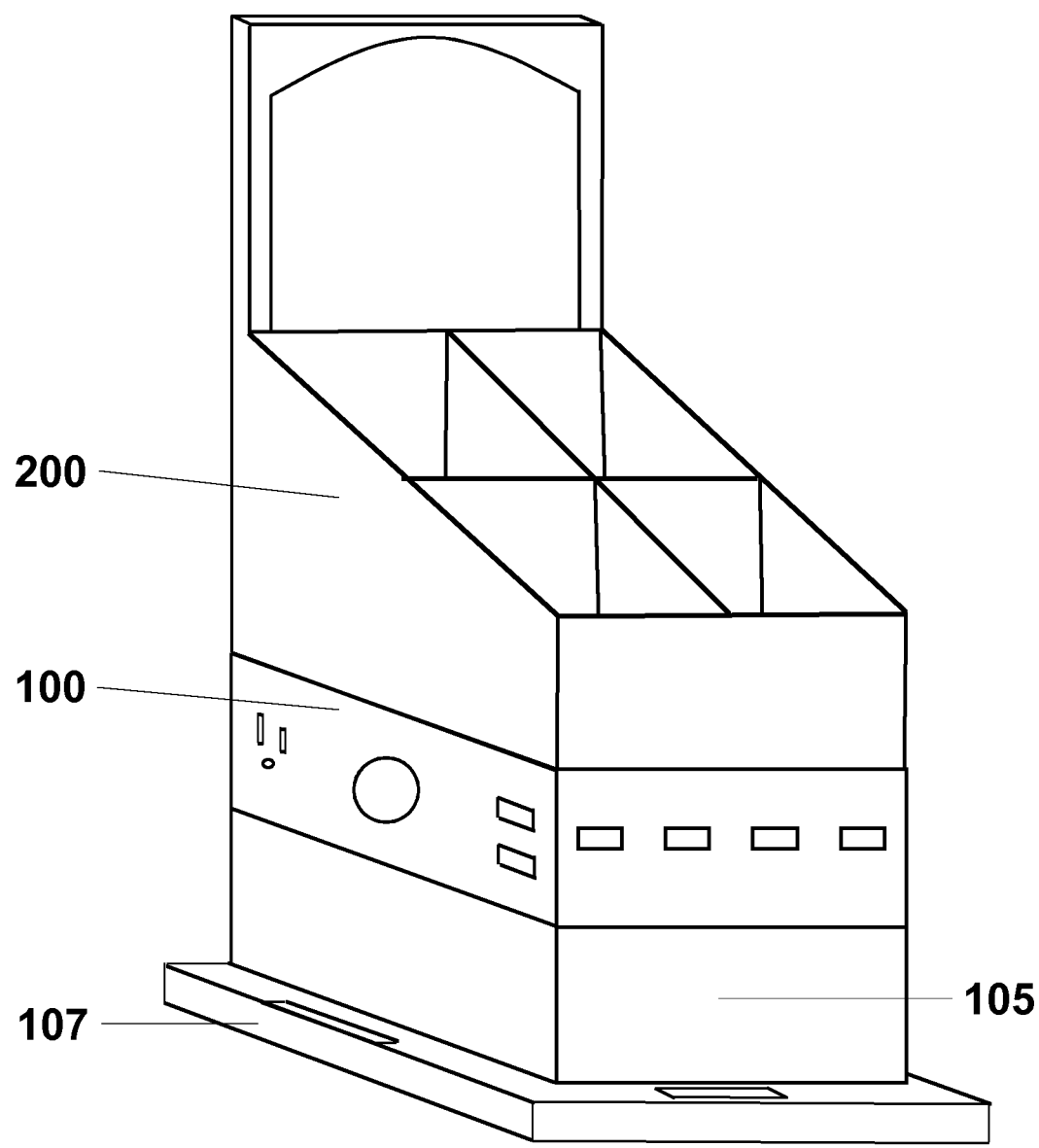
FIG. 5 An embodiment used in a remote location where a power plug is not available comprising of a condiment IMA affixed to a Charging Caddy base, rechargeable battery, and TCD cradle.

FIG. 5 (To be used as front page) To further illustrate another embodiment when a power plug is not readily available, or in a remote location, the Charging Caddy would have the following configuration: an IMA accommodating menus, condiments, or other affixed information 200, a Caddy base 100 a rechargeable battery 105, and the optional TCD cradle 107.

Figure 6:
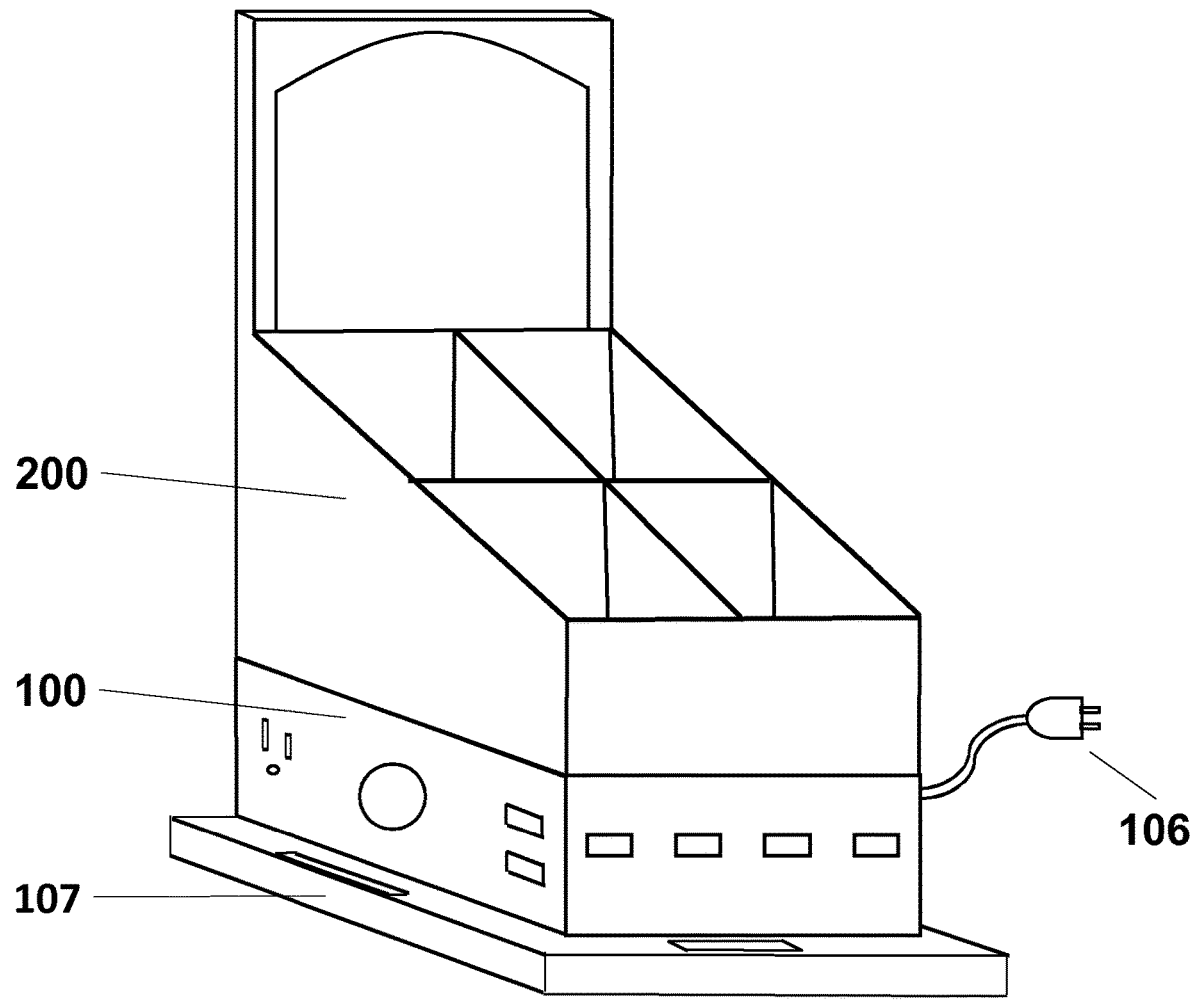
FIG. 6 An embodiment used when a power outlet is readily available comprising of a condiment IMA affixed to a Charging Caddy base with power plug, and TCD cradle.

FIG. 6 Alternatively, if a power plug is available another embodiment of the Caddy could be configured as follows: an IMA accommodating menus, condiments, or other affixed information 200, a Caddy base 100 with power lead 106, and the optional TCD cradle 107.

It should be understood that various changes and modifications of the embodiments shown in the drawings and described in the specifications may be made within the spirit and scope of the present invention. Accordingly, it is intended that all matter contained in the descriptions and shown in the accompanying drawings be interpreted in an illustrative and not a limiting sense. The invention is limited only as defined in claims and the equivalents thereto.

What I claim is:

1. A multi-use, modular charging caddy, comprising:
a base having base sides, a top surface with base interlocking engagement structure, a universal serial bus port, a dedicated charging universal serial bus port and a power output, wherein the universal serial bus port, the dedicated charging universal serial bus port and the power output are operatively connectable to a power source;
a battery upon which the base is stacked, wherein the base is stacked onto a plurality of tabs positioned on a top surface of the battery, wherein the battery provides power to the base;
an interchangeable storage apparatus comprising storage apparatus sides and storage apparatus interlocking engagement structure;
wherein the base interlocking engagement structure mates with the storage apparatus interlocking engagement structure to detachably secure the interchangeable storage apparatus to the base such that at least one base side and at least one storage apparatus side are coplanar with each other and combine to form an outer surface of the modular charging caddy when the interchangeable storage apparatus is stacked on top of the base;
wherein the universal serial bus port, the dedicated charging universal serial bus port and the power output are located on a base side wall of the base side walls that form the outer surface of the modular charging caddy; and
a charging cradle comprising a plurality of tabs that project into and interlock in a bottom surface of the battery, wherein a portion of the charging cradle extends beyond an entire perimeter of a body of the battery when the charging cradle is interlocked with the bottom surface of the battery, and wherein the charging cradle has a slot that is positioned on the portion of the charging cradle that extends beyond the entire perimeter of the body of the battery, wherein at least two tabs of the plurality of tabs are arranged perpendicular to each other.

2. The multi-use, modular charging caddy of claim 1, wherein the interchangeable storage apparatus further comprises a plurality of partitions defining separate storage compartments.

3. The multi-use, modular charging caddy of claim 2, wherein the interchangeable storage apparatus has a length from a front face to a back face of the base, and each of the separate storage compartments extends the entire length of the interchangeable storage apparatus.

4. The multi-use, modular charging caddy of claim 3, wherein the storage compartments are sized to store bar supplies.

5. The multi-use, modular charging caddy of claim 1, wherein the plurality of tabs positioned on the top surface of the battery are aligned with the plurality of tabs of the charging cradle when the base and the charging cradle are interlocked with the battery.

6. The multi-use, modular charging caddy of claim 1, wherein the interchangeable storage apparatus further comprises:
a front end and a back end, wherein the back end has a height greater than the front end, and
a plurality of partitions defining separate storage compartments, wherein each partition that extends in a direction from the front end to the back end of the interchangeable storage apparatus increases in height and depth as the partition extends in the direction from the front end to the back end of the interchangeable storage apparatus.

7. The multi-use, modular charging caddy of claim 6, wherein the interchangeable storage apparatus further comprises an information display located at the back end of the interchangeable storage apparatus and extending upward from the interchangeable storage apparatus.

8. The multi-use, modular charging caddy of claim 7, wherein the storage compartments are sized to store restaurant supplies.

9. The multi-use, modular charging caddy of claim 8, wherein the restaurant supplies are selected from the group consisting menus, condiments and a combination thereof.

10. The multi-use, modular charging caddy of claim 1, wherein the dedicated charging universal serial bus port is located on a first base sidewall of the base side walls that form the outer surface of the modular charging caddy and the universal serial bus port and the power output are located on a second base sidewall of the base side walls that form the outer surface of the modular charging caddy,
wherein the first base sidewall and the second base sidewalls are different base sidewalls.

11. The multi-use, modular charging caddy of claim 10, wherein the power output is a 12 V cigarette lighter port.

12. The multi-use, modular charging caddy of claim 1,
wherein the interchangeable storage apparatus comprises an interchangeable storage apparatus front side, an interchangeable storage apparatus back side, an interchangeable storage apparatus left side, and an interchangeable storage apparatus right side;
wherein the base comprises a base front side, a base back side, a base left side and a base right side;
wherein the interchangeable storage apparatus front side is coplanar with the base front side and combine to form an outer surface of the modular charging caddy when the interchangeable storage apparatus is stacked on top of the base;
wherein the interchangeable storage apparatus back side is coplanar with the base back side and combine to form an outer surface of the modular charging caddy when the interchangeable storage apparatus is stacked on top of the base;

wherein the interchangeable storage apparatus left side is coplanar with the base left side and combine to form an outer surface of the modular charging caddy when the interchangeable storage apparatus is stacked on top of the base; and wherein the interchangeable storage apparatus right side is coplanar with the base right side and combine to form an outer surface of the modular charging caddy when the interchangeable storage apparatus is stacked on top of the base.

13. A multi-use, modular charging caddy, comprising:

a base having base sides, a top surface with base interlocking engagement structure, a universal serial bus port, a dedicated charging universal serial bus port and a power output, wherein the universal serial bus port, the dedicated charging universal serial bus port and the power output are operatively connectable to a power source;

a battery upon which the base is stacked, wherein the base is stacked onto a plurality of tabs positioned on a top surface of the battery, wherein the battery provides power to the base;

an interchangeable display screen housing comprising display screen housing sides and display screen housing interlocking engagement structure;

wherein the base interlocking engagement structure mates with the display screen housing interlocking engagement structure to detachably secure the display screen housing to the base such that at least one base side and at least one display screen housing side are coplanar with each other and combine to form an outer surface of the modular charging caddy when an interchangeable storage apparatus is stacked on top of the base;

wherein the universal serial bus port, the dedicated charging universal serial bus port and the power output are located on a base side wall of the base side walls that form the outer surface of the modular charging caddy; and a charging cradle comprising a plurality of tabs that project into and interlock in a bottom surface of the battery, wherein a portion of the charging cradle extends beyond an entire perimeter of a body of the battery when the charging cradle is interlocked with the bottom surface of the battery, and wherein the charging cradle has a slot that is positioned on the portion of the charging cradle that extends beyond the entire perimeter of the body of the battery, wherein at least two tabs of the plurality of tabs are arranged perpendicular to each other.

14. The multi-use, modular charging caddy of claim 13, wherein the display screen housing provides a display for displaying content selected from the group consisting of advertisements, customer information or both.

15. The multi-use, modular charging caddy of claim 13, wherein the dedicated charging universal serial bus port is located on a first base sidewall of the base side walls that form the outer surface of the modular charging caddy and the universal serial bus port and the power output are located on a second base sidewall of the base side walls that form the outer surface of the modular charging caddy, wherein the first base sidewall and the second base sidewalls are different base sidewalls.

16. The multi-use, modular charging caddy of claim 13, wherein the power output is a 12 V cigarette lighter port.

17. The multi-use, modular charging caddy of claim 13, wherein the interchangeable display screen housing comprises an interchangeable display screen housing front side, an interchangeable display screen housing back side, an interchangeable display screen housing left side, and an interchangeable display screen housing right side;

wherein the base comprises a base front side, a base back side, a base left side and a base right side;

wherein the interchangeable display screen housing front side is coplanar with the base front side and combine to form an outer surface of the modular charging caddy when the interchangeable display screen housing is stacked on top of the base;

wherein the interchangeable display screen housing back side is coplanar with the base back side and combine to form an outer surface of the modular charging caddy when the interchangeable display screen housing is stacked on top of the base;

wherein the interchangeable display screen housing left side is coplanar with the base left side and combine to form an outer surface of the modular charging caddy when the interchangeable display screen housing is stacked on top of the base; and wherein the interchangeable display screen housing right side is coplanar with the base right side and combine to form an outer surface of the modular charging caddy when the interchangeable display screen housing is stacked on top of the base.

18. The multi-use, modular charging caddy of claim 13, wherein the interchangeable display screen housing has a length from a front face to a back face of the base, and a display screen of the interchangeable display screen housing extends the entire length of the interchangeable storage apparatus.

* * * * *